US011398155B2

(12) United States Patent
Dudar et al.

(10) Patent No.: US 11,398,155 B2
(45) Date of Patent: Jul. 26, 2022

(54) SYSTEMS AND METHODS FOR MULTILEVEL PARKING STRUCTURE UTILIZATION AND REPORTING

(71) Applicant: Ford Global Technologies, LLC, Dearborn, MI (US)

(72) Inventors: Aed M. Dudar, Canton, MI (US); Mahmoud Y. Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/133,576

(22) Filed: Dec. 23, 2020

(65) Prior Publication Data

US 2022/0198929 A1  Jun. 23, 2022

(51) Int. Cl.
| | | |
|---|---|---|
| *G08G 1/14* | (2006.01) | |
| *G05D 1/02* | (2020.01) | |
| *G08G 1/056* | (2006.01) | |

(52) U.S. Cl.
CPC ........... *G08G 1/143* (2013.01); *G05D 1/0272* (2013.01); *G05D 1/0278* (2013.01); *G08G 1/056* (2013.01); *G08G 1/145* (2013.01); *G05D 2201/0213* (2013.01)

(58) Field of Classification Search
CPC ........ G08G 1/143; G08G 1/056; G08G 1/145; G05D 1/0272; G05D 1/0278; G05D 2201/0213
See application file for complete search history.

(56) References Cited

U.S. PATENT DOCUMENTS

| | | | | |
|---|---|---|---|---|
| 6,405,125 | B1 * | 6/2002 | Ayed | G01C 21/20 |
| | | | | 701/1 |
| 9,086,285 | B2 * | 7/2015 | Gupta | G01C 21/165 |
| 9,478,134 | B2 * | 10/2016 | Narayanan | G08G 1/0112 |
| 9,644,970 | B2 * | 5/2017 | Sun | B60W 10/00 |
| 9,959,758 | B2 * | 5/2018 | Magnusson | G08G 1/205 |
| 10,308,244 | B2 | 6/2019 | Penilla et al. | |
| 10,535,270 | B2 * | 1/2020 | Lee | G07C 5/0825 |
| 10,636,305 | B1 * | 4/2020 | Schmidt | H04W 4/44 |
| 2006/0267799 | A1 | 11/2006 | Mendelson | |
| 2016/0104378 | A1 | 4/2016 | Narayanan et al. | |
| 2020/0132473 | A1 * | 4/2020 | Shipley | G01S 19/49 |

FOREIGN PATENT DOCUMENTS

CN   106169247 A   11/2016

OTHER PUBLICATIONS

D.Ashvini Alias Lakshmipriya et al. "Intelligent Vehicle Parking Lot Locator" IJERCSE, vol. 5, Issue 3 (Mar. 2018) pp. 323-328.

* cited by examiner

*Primary Examiner* — John A Tweel, Jr.
(74) *Attorney, Agent, or Firm* — Brandon Hicks; Eversheds Sutherland (US) LLP (57) ABSTRACT

Systems and methods for multilevel parking structure utilization and reporting are disclosed herein. An example method includes obtaining a layout that identifies ramps, turns, and level portions of a multilevel parking structure, determining vehicle data gathered as the vehicle operates within the multilevel parking structure, the vehicle data including steering input, compass headings, and distance traveled, and determining a current level of a vehicle within the multilevel parking structure by tracking the vehicle's use of the ramps, the turns, and the level portions in combination with the layout.

20 Claims, 5 Drawing Sheets

SYSTEMS AND METHODS FOR MULTILEVEL PARKING STRUCTURE UTILIZATION AND REPORTING

BACKGROUND

Customers may park their vehicles in multilevel parking structures that may include several levels. Some parking structures may have several levels above ground as well as several levels below ground. When customers park their vehicles, they may forget which level their vehicle is parked. Customers may attempt to determine their vehicle location using a key fob or phone as a key (PaaK) device. For example, the user can actuate the key fob to honk the horn of the vehicle or activate the vehicle's lights or alarm. These processes do not work well in some parking garages due to the fact that radio signals emitted by the key fob may be attenuated by the many levels of concrete of the multilevel parking structures. Reliance on satellites or cell towers for location information may be ineffective due to signal attenuation. As a result, customers may have to search for their vehicle level by level, which takes time and can be frustrating.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is generally directed to systems and methods for multilevel parking structure utilization and reporting. Generally, a vehicle's location within a multilevel parking structure can be assessed based on a known layout of the multilevel parking structure in combination with vehicle data obtained as the vehicle traverses/operates inside the multilevel parking structure. These evaluations allow for a determination of a current level of the multilevel parking structure in which the vehicle is located.

Further, a more refined or relative location of the vehicle can be determined that can help identify a particular parking spot or area of parking spots where the vehicle is located. The relative location of the vehicle can be matched with cardinal or inter-cardinal directions of the multilevel parking structure or adjacent streets based on vehicle compass headings.

Illustrative Embodiments

Figure 1:
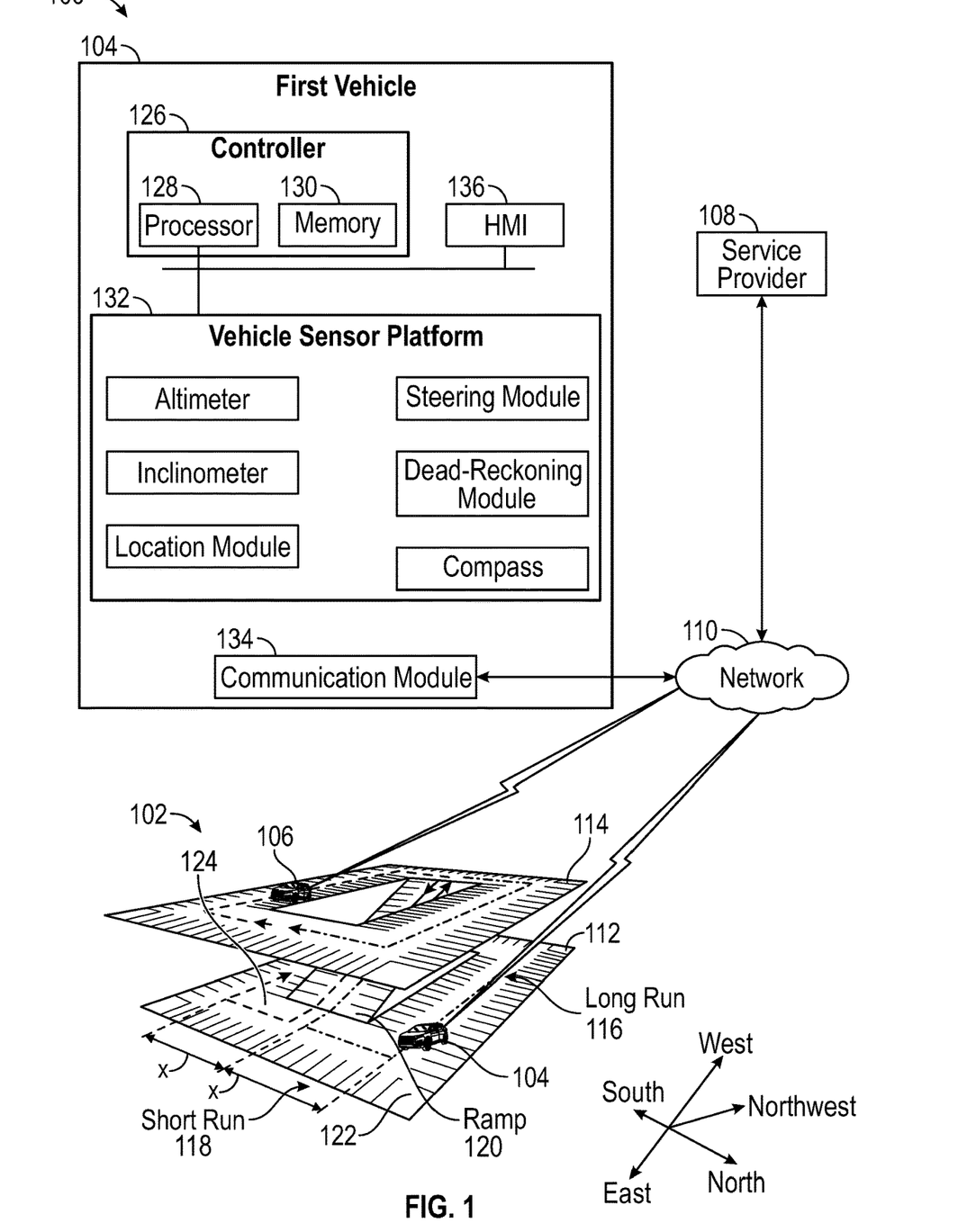
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The architecture 100 can include a multilevel parking structure layout 102, a first vehicle 104, a second vehicle 106, and a service provider 108. Each of these components in the architecture 100 can communicate using a network 110. The network 110 can include combinations of networks that enable the components in the architecture 100 to communicate with one another. The network 110 may include any one or a combination of multiple different types of networks, such as cable networks, the Internet, wireless networks, and other private and/or public networks. In some instances, the network 110 may include cellular, Wi-Fi, or Wi-Fi direct.

Generally, the first vehicle 104 can be configured to determine which level it is located on (e.g., current level) based on a comparison of vehicle data collected over time as the first vehicle travels within a multilevel parking structure. The current level of the first vehicle can be determined relative to the multilevel parking structure layout 102, as discussed in greater detail herein.

The multilevel parking structure layout 102 represents an example schematic of a multilevel parking structure. In general, the multilevel parking structure layout 102 includes a plurality of floors/levels, rises, runs (runs can be defined by short and/or long run distances), and orientation of rise and runs with respect to cardinal and/or inter-cardinal directions. To be sure, cardinal directions include North, South, East, and West, while inter-cardinal directions include, for example, Northwest or Northeast.

The multilevel parking structure layout 102 can be used as a reference to determine a current vehicle level in combination with the vehicle data that is gathered. The multilevel parking structure layout 102 can be used as a guide to allow an autonomous vehicle (AV) to navigate the multilevel parking structure. That is, the AV may rely on the multilevel parking structure layout 102 to navigate itself to a particular level of the multilevel parking structure or a parking spot or other refined location on a particular level.

The multilevel parking structure layout 102 has two floors or levels, such as a first level 112 and a second level 114. Both the first level 112 and the second level 114 include long runs and short runs. For example, the first level 112 includes two long runs, such as long run 116 and two short runs, such as short run 118. The short runs can be further divided into segments based on their orientation relative to a ramp 120. The combination of long and short runs allows vehicles to circle a level. The ramp 120 allows vehicles to ascend or descend between the first level 112 and the second level 114. To be sure, the multilevel parking structure layout 102 is merely an example and is not intended to be limiting.

The dimensions of the levels (comprised of segments of runs) and ramps can be included in the multilevel parking structure layout 102. For example, long runs can be 100 yards in length, while short runs can be 50 yards in length. The ramp 120 can be defined by both a pitch and a length. For example, the ramp 120 can have a pitch or grade of 20% while the length can be 50 yards. To be sure, these dimensions/parameters of the individual elements of the multilevel parking structure layout 102 can vary according to individual parking structure designs. In addition to including parameters of length and pitch, elements of the multilevel parking structure layout 102 can include cardinal and/or inter-cardinal directions. For example, the ascending direction of the ramp 120 can be oriented from East to West. The descending direction of the ramp 120 can be oriented from West to East. The multilevel parking structure layout 102 can also include a plurality of turns, such as a corner turn 122 and a ramp turn 124. The corner turn 122 is associated with a flat portion of a level where two runs intersect. For example, the corner turn 122 is associated with the long run 116 and the short run 118 of the first level 112. A ramp turn is located where a run intersects with a ramp. For example, the ramp turn 124 is located where the short run 118 intersects with the ramp 120.

The first vehicle 104 can include any desired vehicle type such as a car, truck, e-scooter, e-bicycle, and the like. The first vehicle 104 can include a connected vehicle that is capable of communicating over the network 110, as will be discussed in greater detail herein. The first vehicle 104 can also be an automated vehicle or a semi-autonomous vehicle.

The first vehicle 104 can comprise a controller 126 having a processor 128 and memory 130. The memory 130 comprises instructions that can be executed by the processor 128 to perform functions related to assessing and reporting of a current level of the first vehicle within a multilevel parking structure using the multilevel parking structure layout 102, as well as output from a vehicle sensor platform 132. The vehicle sensor platform 132 can obtain the vehicle data, which can include any combination of steering inputs, compass headings, and distance traveled. The vehicle sensor platform 132 can include, but is not limited to a compass, an altimeter, an inclinometer, a location module, a steering module, and a dead-reckoning module—just to name a few. The compass can output compass headings that indicate a direction of travel of the first vehicle 104. These compass headings are indicative of cardinal and/or inter-cardinal directions that can be correlated to the cardinal and/or inter-cardinal directions of the multilevel parking structure layout 102.

The altimeter can indicate an altitude of the first vehicle 104, which can be used to infer or verify an inferred determination of a current level of the first vehicle within the multilevel parking structure. The altitude data can be correlated to the altitude data found in the multilevel parking structure layout 102.

An inclinometer can be used to determine a pitch or angle of the vehicle to determine if the first vehicle 104 is traveling on an inclined surface, a declined surface, and/or a flat surface. That is, the controller 126 can utilize output obtained from a pitch sensor that indicates when the vehicle is operating at an incline or a decline. The inclined/declined surfaces are indicative of a ramp and the flat surfaces are indicative of a run (long or short). The incline data can be correlated to the incline/pitch data found in the multilevel parking structure layout 102. The inclinometer is an optional feature on some vehicle and may not be present. Thus, determinations as to whether the vehicle is operating at an incline or decline are made by correlating vehicle distance traveled in combination with steering inputs to data included in the multilevel parking structure layout 102.

The location module can be used to determine global positioning system (GPS) coordinates for the first vehicle 104. The GPS coordinates can be used to identify when the first vehicle 104 is approaching, has entered, and/or is within a multilevel parking structure. It will be understood that GPS signals may be inaccurate or unavailable as the first vehicle travels into the multilevel parking structure, although if available these signals can be used in current level determinations.

The steering module can be configured to obtain real-time steering inputs from another vehicle sensor or platform. The steering inputs indicate when a driver turns a steering wheel of the vehicle, and to what degree. The dead-reckoning module can be used to obtain distance traveled values for the first vehicle 104. For example, the dead-reckoning module obtains distance traveled by the first vehicle 104 based on counts of wheel revolutions of the vehicle. As noted above, the distance traveled by the vehicle can be correlated to distance/length measurements found in the multilevel parking structure layout 102.

The first vehicle 104 can also comprise a communications module 134 that allows the controller 126 to transmit and/or receive data across the network 110. For example, the first vehicle 104 can receive the multilevel parking structure layout 102 from the service provider or from the second vehicle 106, when the first vehicle 104 and the second vehicle 106 are configured for vehicle-to-vehicle (V2V) communication. The second vehicle 106 can provide the multilevel parking structure layout 102 as instructions based on prior operation of the second vehicle 106 within the multilevel parking structure. The multilevel parking structure layout 102 can also be obtained from a smart device (such as a smart parking system) or access point within the multilevel parking structure.

By way of example, if a multilevel parking structure layout is unavailable, then data from peer vehicles that have parked their vehicles on a known floor may be obtained and used as reference. As vehicles enter a garage they can record steering inputs, distance traveled, and compass data. That data is then shared with other vehicles to help them determine what level they are on. When a vehicle enters a multilevel parking structure, it can collect the same data and compare it to known profiles from other vehicles and when a profile match is found, the parking floor is determined. For example, a vehicle enters a garage and can be provided with a unique entry profile for the following vehicle data such as steering wheel inputs and distance traveled in cardinal direction(s) before it begins to climb ramps. After a vehicle is parked, a controller of the vehicle may compare its profile of the three or more characteristics such as steering inputs, distance traveled, compass headings, against uploaded profiles of other vehicles to determine the floor it is on.

The first vehicle 104 can also include a human-machine interface (HMI) 136 that displays a message to a driver of the first vehicle 104 that indicates a current floor for the first vehicle 104. Alternatively, the message can be transmitted to a mobile device of the driver over the network 110.

In one example, the multilevel parking structure layout 102 includes orientation information with respect to cardinal (and inter-cardinal) directions, and dimensions (rise, run, x (distance), and so forth) obtained from the service provider 108. The controller 126 of the first vehicle 104 counts the distance for a rise (e.g., up a ramp) while the vehicle is traveling West, and registers a 90-degree turn clockwise, and then the first vehicle 104 heads North briefly. The controller 126 of the first vehicle 104 counts a distance of the next run while heading East, and registers a 90 degree turn clockwise, and then counts x distance heading South, and registers another 90-degree turn clockwise. If the controller 126 counts a short run "2x" between the two 90 degree turns, then controller 126 infers that the first vehicle 104 is circling within a floor and has not ascended to another floor.

In another example use case, GPS device can detect the entry of a vehicle into a multilevel parking structure. As noted above, GPS does not have adequate resolution/knowledge to detect garage floor heights. Upon entering a garage, it is typical to have a rise segment, followed by a sharp turn, run segment, sharp turn, and so forth. This pattern repeats for each floor traversed, depending on the multilevel parking structure.

Onboard sensors of the vehicle sensor platform can be used to detect the rise, run, and turning events of navigating inside a parking garage. In addition, as future vehicles are connected, before entering the garage, the vehicle may download the parking structure layout from a cloud-based server to extract the rise, run data.

For example, the vehicle obtains multilevel parking structure layout data on the parking structure (orientation of up travel inside floors, the orientation of down travel inside floors directions, floor run length, number of floors, and so forth) from an infrastructure cloud such as the service provider 108. Alternatively, the data could be mined from V2V (other connected vehicles that have driven through the garage and parked on a particular floor).

A rise (e.g., ascending from one level to another) of the garage level can be detected by onboard sensors of the vehicle such as a range cell migration (RCM) altimeter signal but this is optional, which is an indication that vehicle pitch is up (or down). An inclinometer can be used as well, if available. If an altimeter is not onboard, ascending and/or descending travel may be inferred by whether the vehicle is traveling in opposite cardinal directions during a run segment. Using the multilevel parking structure layout 102, the vehicle can determine when it is rising/ascending based on the compass direction during the run segment being from West to East. When the vehicle is descending, the travel direction is from East to West.

The distance traveled along the ramp 120 may be calculated using a dead reckoning method of counting wheel revolutions, as noted above. The controller 126 can count the number of feet traveled until the amount is roughly equal to the rise ramp in the multilevel parking structure layout 102. An end of the ramp 120 is encountered and determined when steering wheel input indicates that the vehicle is being steered towards a long or short run segment.

In another example, the long or short run of a garage level can be detected by the controller 126 using a compass heading and as well as dead reckoning through counting wheel rotations of the vehicle within the garage level. A pitch of the vehicle may be flat. As the vehicle enters the parking garage at level zero (first/lower level as illustrated in the multilevel parking structure layout 102) the controller 126 uses the multilevel parking structure layout 102 to determine how many turns may be encountered before a first ramp is encountered. The controller 126 can count the distance traveled inside the garage while traveling along with the cardinal directions of the floors and comparing it to the rise and run lengths of the multilevel parking structure layout 102. If the garage level is oriented such that an entrance is from East and travel is toward West, then the controller 126 can monitor the compass to ensure travel inside the garage level is consistent with data obtained from the multilevel parking structure layout 102.

When the vehicle reaches the end of a run segment, the vehicle may turn and traverse up a ramp to a new, higher floor. This ascension can be determined as noted above however, some vehicles may keep driving in circles on the same floor in search of a parking spot.

Thus, the controller 126 can be configured to detect that the vehicle is circling the same garage level by utilizing the same sensor output from the vehicle sensor platform, along with the data of the multilevel parking structure layout 102. For example, a ramp may be located in the middle of the multilevel parking structure. Upon reaching the end of a short or long run segment, if steering input indicates only a 90-degree turn and the controller 126 determines that the vehicle has traveled beyond the ramp distance as detected by dead reckoning, then another turn of 90 degrees, the controller 126 may infer that the vehicle is circling inside the same level.

The controller 126 can be configured to determine if the vehicle has ascended, descended, or is circling a level based on a variety of factors. For example, a vehicle can enter a garage and follow a turn profile as indicated in the layout map or mined data from peer vehicles to get to a ramp. Once at the ramp, the controller 126 can determine that the vehicle has ascended from one level to another using one of the ramps when one or more conditions occur. These conditions include but are not limited to, a direction of travel of the vehicle corresponds to an upward cardinal or inter-cardinal direction as determined from the layout and the compass headings. In another example, the distance traveled by the vehicle matches a length of a garage level based on the layout, and/or the steering input indicates that a 90-degree turn has occurred at an end of one of the level portions followed by 90-degree steering input. Another condition can include that the direction of travel of the vehicle is opposite of the upward cardinal or inter-cardinal direction until the vehicle parks. The determination that the vehicle has ascended between levels can be made when all or a portion of these conditions are met.

The controller 126 can be configured to determine that the vehicle has descended from one level to another using one of the ramps when one or more conditions occur. The conditions can include but are not limited to, a direction of travel of the vehicle corresponds to a downward cardinal or inter-cardinal direction as determined from the layout and the compass headings, the distance traveled by the vehicle matches a length of a garage level based on the layout, the steering input indicates that a 90-degree turn has occurred at an end of one of the level portions followed by 90-degree steering input, and a direction of travel of the vehicle is opposite of the downward cardinal or inter-cardinal direction until the vehicle parks. The determination that the vehicle has descended between levels can be made when all or a portion of these conditions are met. A determination as to the vehicle ascending or descending between levels can be confirmed or validated using output from an altimeter of the vehicle sensor platform (if available).

The controller 126 can be configured to determine that the vehicle is circling on the same level inside the garage using various conditions that include, but are not limited to, travel along with an upward/ascending travel cardinal or inter-cardinal directions as obtained from a multilevel parking structure layout (East to West for example), distance traveled as counted by wheel revolutions matches the length of garage level from garage layout map, the output of an RCM pitch/altimeter sensor indicated flat (optional, if equipped on vehicle), steering wheel input that indicates a steering wheel turn at end of travel followed by travel distances (corresponding to a short run, for example) correlated to end of segment followed by another 90 degrees steering input. Another condition can include an indication of vehicle travel in the inverse/downward cardinal or inter-cardinal directions (West to East) until the end of travel (e.g., when the vehicle parks).

In one example, the controller 126 can be configured to infer that the first vehicle 104 is ascending or descending between a first level and a second level based on a change in the compass headings from a first heading to a second heading as the vehicle completes one of the turns as determined from the steering input. In another example, the controller 126 can determine that the first vehicle 104 is traveling across one of the level (flat) portions of the parking structure when a pitch of the first vehicle 104 is flat and the wheels of the first vehicle 104 are turning over a specified distance as determined through dead reckoning analysis.

The controller 126 can be configured to determine a relative location of a parking spot occupied by the first vehicle 104 on the current level. That is after the current level is determined, the controller 126 can utilize various data to determine a relative location of the vehicle on the level. Stated otherwise, the controller 126 can determine a relative location of a vehicle on a floor using the dead reckoning method. For instance, a travel distance of the vehicle is 50 yards. After detecting a 90 degree turn at the beginning of a new run segment, the vehicle then travels five yards and is oriented in the cardinal direction of West (as determined from compass direction). Thus, the relative location can be refined based on a direction of travel of the vehicle as identified in the compass headings.

The vehicle then stops/parks at a parking spot on the floor. The vehicle may display the relative location of the parking spot within the floor as a message such as "Your vehicle is parked on the 3rd floor toward the East side of the structure". The controller 126 can relate the cardinal direction to a street name by cross-referencing the onboard location module to the location of the vehicle inside the garage such as a message: "Your vehicle is parked on the 3rd floor adjacent the Oakwood Blvd side."

Conversely, if the vehicle travels 45 yards within the floor as in the above example, then the controller 126 can infer that vehicle is parked on the 3rd floor toward the West side of the structure. Thus, not only is the floor level indicated but also the relative location as to the parking spot within the floor level. This is communicated to the customer in order to better assist in foot navigation/knowing which staircase/entrance to take to get to the vehicle.

These methods can be used in combination with a known parking direction determined from vehicle compass headings while the vehicle is parking. Most vehicles may park in the same direction with the same lane. These lanes are mostly arranged along a one-way path within the parking structure and atypically slanted at the ramps. The controller 126 can implement a prediction algorithm and apply artificial intelligence to evaluate the last parking conditions as follows: identifying forward vehicle travel in combination with a first compass direction=−5, −3, −1, 1, 3, 5 (odd levels); identifying forward vehicle travel in combination with a second compass direction=−4, −2, 0, 2, 4, (even levels), and so forth. This directional logic increases a confidence level of the calculation and narrows the probability of searching.

Figure 2:
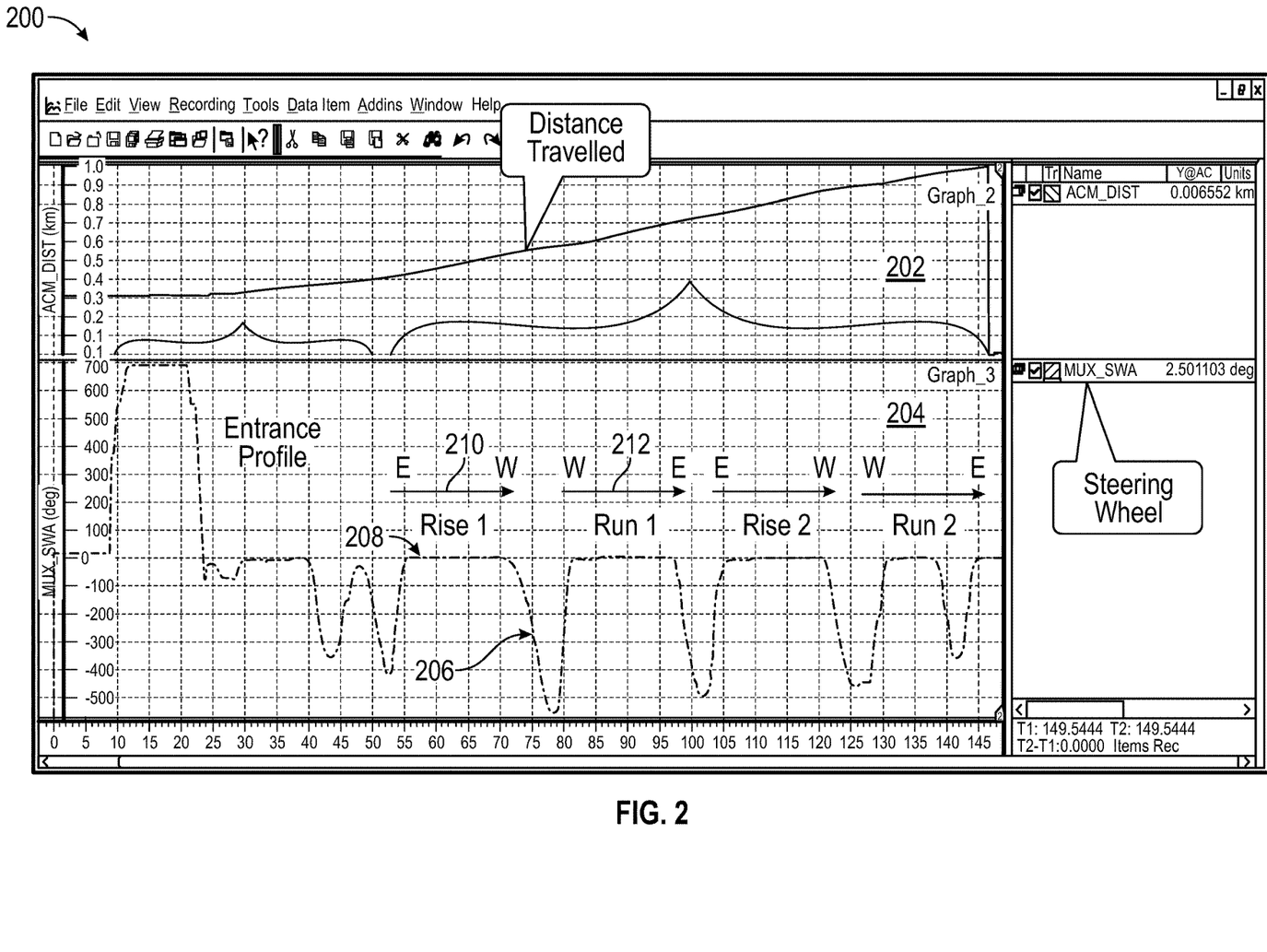
FIG. 2 is a screenshot of a graphical user interface that includes various graphs that indicate that a vehicle is ascending from one level to another in a parking structure.

FIG. 2 is a screenshot of a graphical user interface 200 that includes various graphs that indicate that a vehicle is ascending from one level to another in a parking structure. For example, the interface 200 includes a distance traveled graph 202 that is created from dead-reckoning data such as wheel rotations. A steering wheel input graph 204 is illustrated that indicates when the vehicle encounters various turns in the parking structure. For example, the troughs, such as trough 206 indicate steering wheel input and thus the vehicle navigating a turn. Flat plateaus, such as plateau 208 indicate when steering wheel input is neutral, which indicates that the vehicle is traveling in a straight path. These data can be matched with compass headings. For example, directionality data of E-W 210 is associated with the vehicle traveling along a rise area, such as a ramp. The directionality data switches to W-E 212 when the vehicle is traveling along a long run, for example. The directionality data obtained from vehicle compass headings is compared with the multilevel parking structure layout to determine runs, rises, and so forth.

Figure 3:
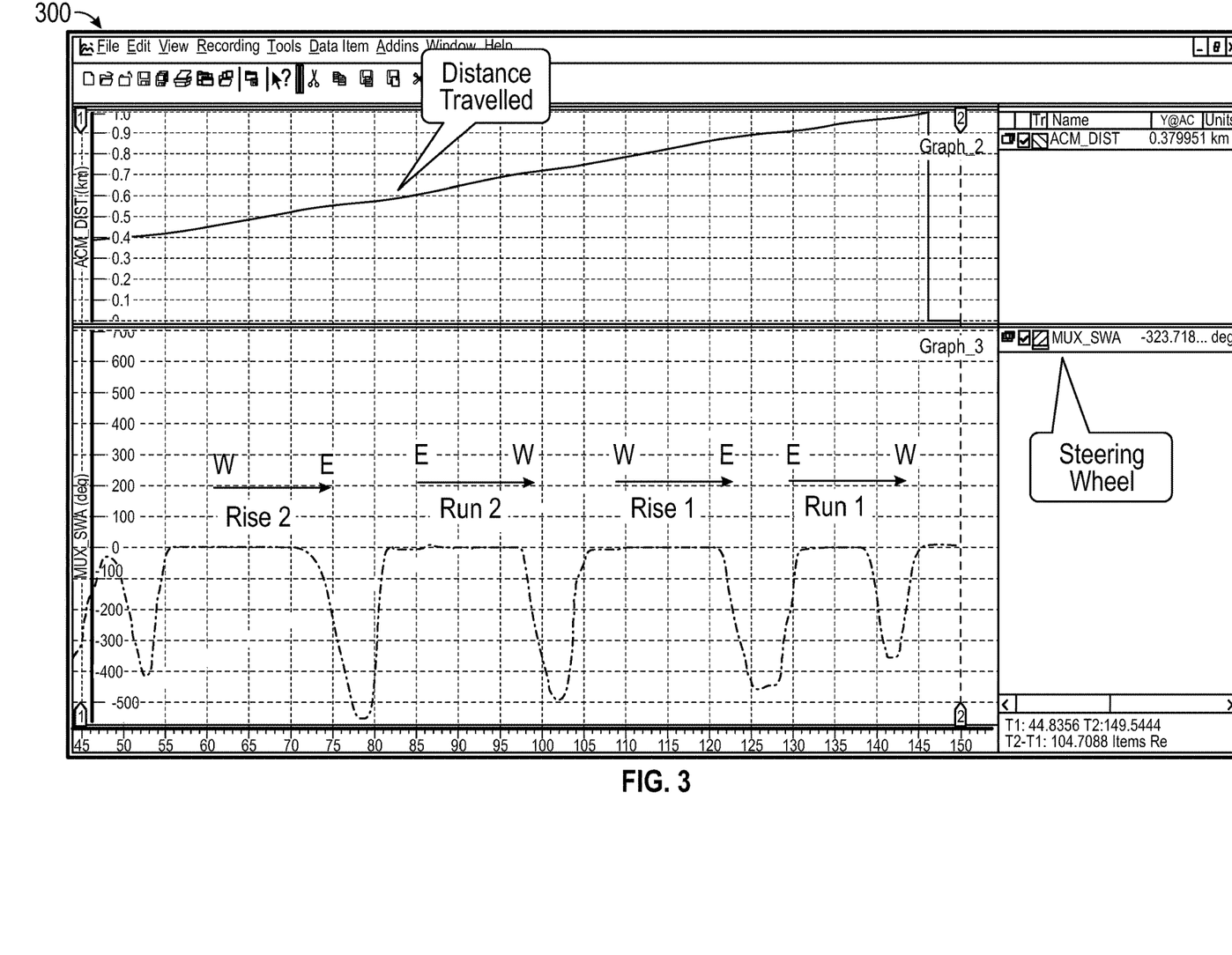
FIG. 3 is a screenshot of a graphical user interface that includes various graphs that indicate that a vehicle is descending from one level to another in a parking structure.

FIG. 3 is a screenshot of a graphical user interface 300 that includes various graphs that indicate that a vehicle is descending from one level to another in a parking structure. To be sure, this graph is similar to the interface 200 of FIG. 2 but the directionality data obtained from vehicle compass headings is opposite that which is illustrated in FIG. 2.

Figure 4:
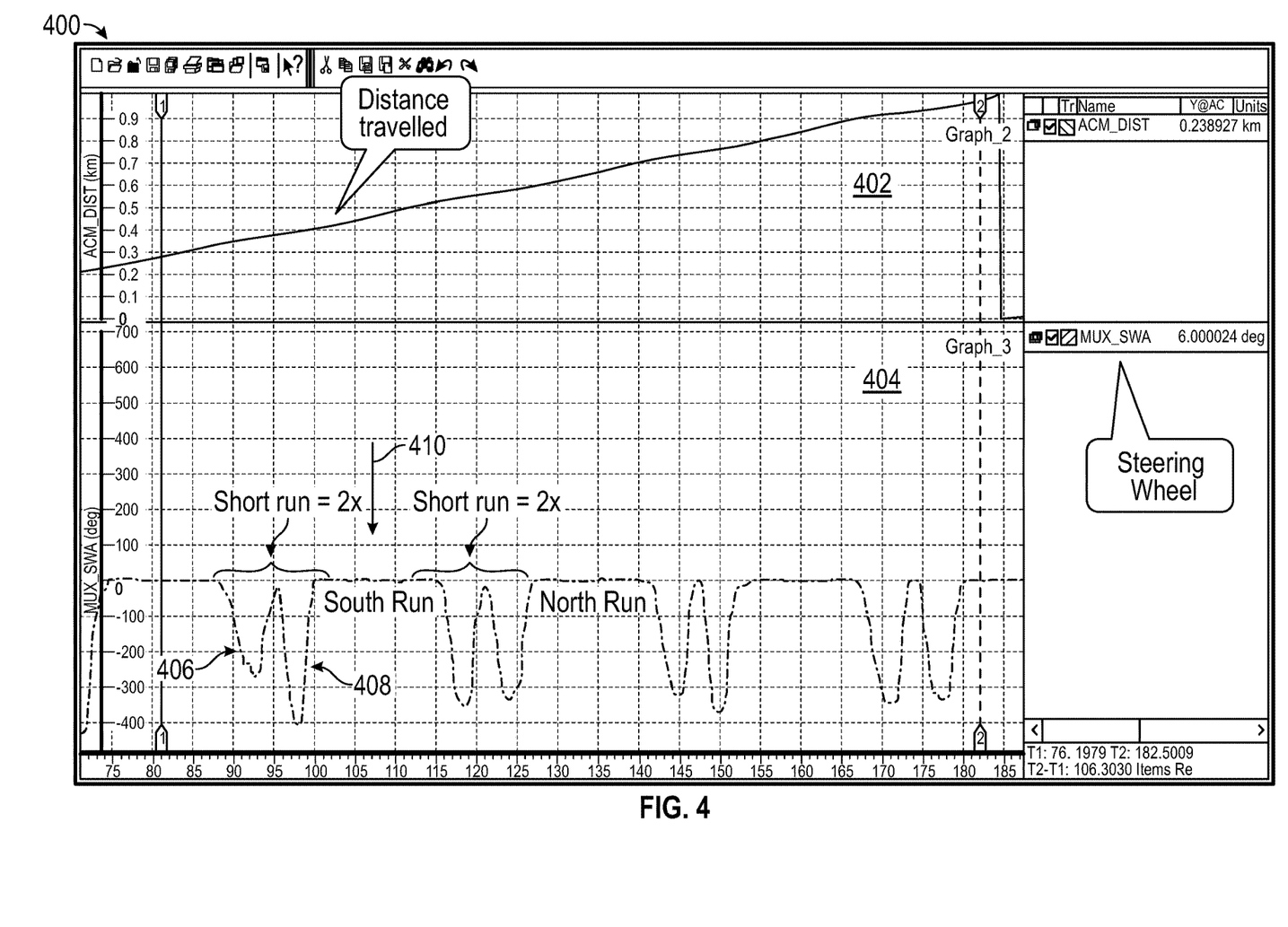
FIG. 4 is a screenshot of a graphical user interface that includes various graphs that indicate that a vehicle is circling a level of a parking structure.

FIG. 4 is a screenshot of a graphical user interface 400 that includes various graphs that indicate that a vehicle is circling a level of a parking structure. A first graph 402 illustrates a distance traveled by the vehicle. A second graph 404 illustrates steering wheel input. The second graph includes troughs, such as troughs 406 and 408 that are indicative of back-to-back steering inputs where the vehicle is successively navigating to turns on a single floor back to back. These back-to-back steering input signatures are separated by flat run signatures, such flat run signature 410.

Figure 5:
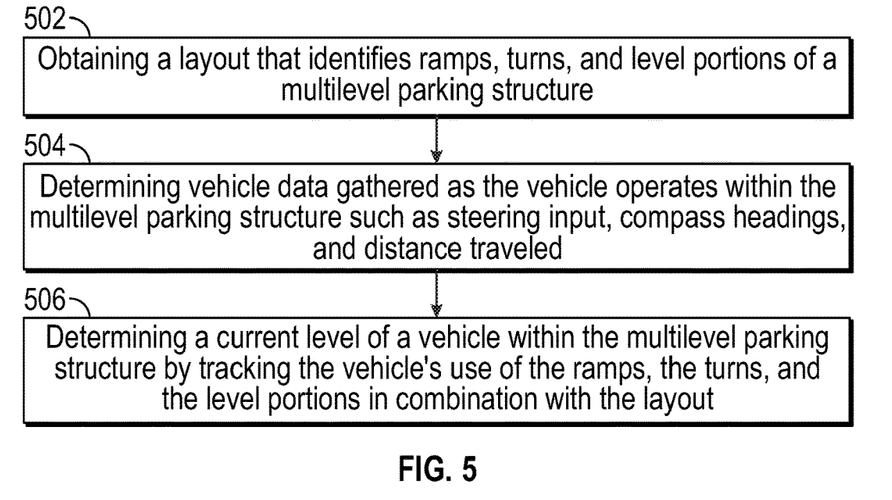
FIG. 5 is a flowchart of an example method of the present disclosure.

FIG. 5 is a flowchart of an example method of the present disclosure. The method can include a step 502 of obtaining a layout that identifies ramps, turns, and level portions of a multilevel parking structure. As noted above, these can also be referred to as rises and runs of the multilevel parking structure. The layout can be obtained from a service provider or a connected vehicle that has previously operated in the multilevel parking structure. The layout identifies locations, lengths, and cardinal or inter-cardinal directions of the ramps, the turns, and the level portions.

The method can further include a step 504 of determining vehicle data gathered as the vehicle operates within the multilevel parking structure. It will be understood that the vehicle data comprises steering input, compass headings, and distance traveled obtained from a vehicle sensor platform by a controller of the vehicle.

The method can also include a step 506 of determining a current level of a vehicle within the multilevel parking structure by tracking the vehicle's use of the ramps, the turns, and the level portions in combination with the layout. That is, the layout is used in combination with vehicle data obtained from the vehicle sensor platform to determine or infer where the vehicle is within the parking structure.

The method can include additional steps related to determining when/if the vehicle has entered the multilevel parking structure based on global positioning system (GPS) coordinates of the vehicle. The method can also include steps such as determining the distance traveled using dead-reckoning based on counts of wheel revolutions of the vehicle, and determining when the vehicle is circling a particular level of the multilevel parking structure.

Figure 6:
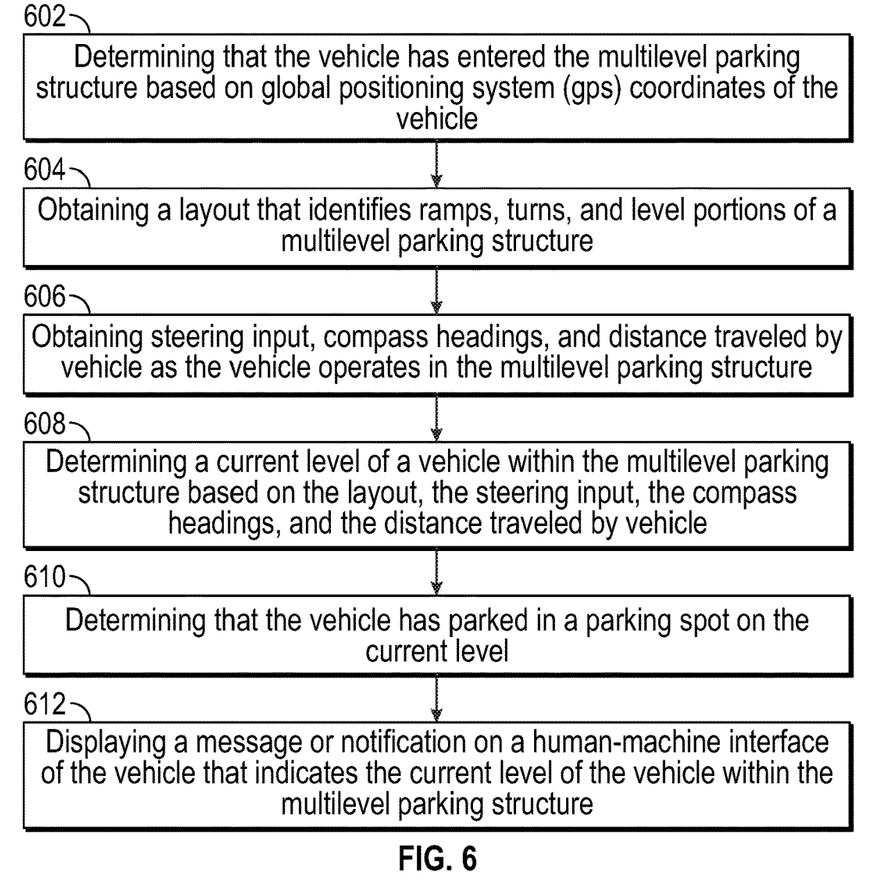
FIG. 6 is a flowchart of another example method of the present disclosure.

FIG. 6 is a flowchart of an example method of the present disclosure. The method includes a step 602 of determining that the vehicle has entered the multilevel parking structure based on global positioning system (GPS) coordinates of the vehicle. Next, the method can include a step 604 of obtaining a layout that identifies ramps, turns, and level portions of a multilevel parking structure.

The method may further include a step 606 of obtaining steering input, compass headings, and distance traveled by the vehicle as the vehicle operates in the multilevel parking structure. Next, the method includes a step 608 of determining a current level of a vehicle within the multilevel parking structure based on the layout, the steering input, the compass headings, and the distance traveled by the vehicle.

The method may include a step 610 of determining that the vehicle has parked in a parking spot on the current level, as well as a step 612 of displaying a message or notification on a human-machine interface of the vehicle that indicates the current level of the vehicle within the multilevel parking structure.

In another example method, a controller of a vehicle can be configured to determine that the vehicle has entered a multilevel parking structure, the multilevel parking structure having ramps, turns, and level portions. The controller can further be configured to obtain a layout of the multilevel parking structure. As noted, the layout comprises locations, lengths and cardinal or inter-cardinal directions of the ramps, the turns, and the level portions. The controller can also determine vehicle data gathered as the vehicle operates within the multilevel parking structure. The vehicle data comprising any combination or all of the steering input, compass headings, and distance traveled. The controller can then determine a current level of a vehicle within the multilevel parking structure using the layout and the vehicle data.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    obtaining a layout of a multilevel parking structure, wherein the layout includes ramps, turns, and level portions of the multilevel parking structure;
    gathering vehicle data as a vehicle operates within the multilevel parking structure, the vehicle data comprising steering input, compass headings, and distance traveled; and
    determining a current level of the vehicle within the multilevel parking structure by correlating the vehicle data to the layout.

2. The method according to claim 1, further comprising determining that the vehicle has entered the multilevel parking structure based on global positioning system (GPS) coordinates of the vehicle.

3. The method according to claim 1, wherein the layout is obtained from a service provider or a connected vehicle that has previously operated in the multilevel parking structure, the layout identifying locations, lengths, and cardinal or inter-cardinal directions of the ramps, the turns, and the level portions.

4. The method according to claim 1, further comprising determining the distance traveled using dead-reckoning based on counts of wheel revolutions of the vehicle.

5. The method according to claim 1, further comprising determining when the vehicle is circling a particular level of the multilevel parking structure.

6. The method according to claim 1, further comprising determining that the vehicle is traveling across one of the level portions when a pitch of the vehicle is flat and wheels of the vehicle are turning over a specified distance.

7. The method according to claim 1, further comprising inferring that the vehicle is ascending or descending between a first level and a second level based on a change in the compass headings from a first heading to a second heading as the vehicle completes one of the turns as determined from the steering input.

8. The method according to claim 1, further comprising determining that the vehicle is ascending or descending based on output from an altimeter or an inclinometer.

9. A method, comprising:
    obtaining a layout that identifies ramps, turns, and level portions of a multilevel parking structure;
    obtaining steering input, compass headings, and distance traveled by a vehicle within the multilevel parking structure;
    determining a current level of the vehicle within the multilevel parking structure based on the layout, the steering input, the compass headings, and the distance traveled by the vehicle;
    determining that the vehicle has parked in a parking spot on the current level; and
    generating a message for display on a human-machine interface of the vehicle that indicates the current level of the vehicle within the multilevel parking structure.

10. The method according to claim 9, further comprising determining a relative location of the parking spot on the current level.

11. The method according to claim 10, wherein the relative location is refined based on a direction of travel of the vehicle as identified in the compass headings.

12. The method according to claim 9, further comprising determining that the vehicle has ascended from one level to another using one of the ramps when one or more conditions occur:
    a direction of travel of the vehicle corresponds to an upward cardinal or inter-cardinal direction as determined from the layout and the compass headings;
    the distance traveled by the vehicle matches a length of a garage level based on the layout;
    the steering input indicates that a 90 degree turn has occurred at an end of one of the level portions followed by 90 degree steering input; and/or
    the direction of travel of the vehicle is opposite of the upward cardinal or inter-cardinal direction until the vehicle parks.

13. The method according to claim 12, further comprising determining that the vehicle has descended from one level to another using one of the ramps when one or more conditions occur:
- a direction of travel of the vehicle corresponds to a downward cardinal or inter-cardinal direction as determined from the layout and the compass headings;
- the distance traveled by the vehicle matches a length of a garage level based on the layout;
- the steering input indicates that a 90 degree turn has occurred at an end of one of the level portions followed by 90 degree steering input; and/or
- a direction of travel of the vehicle is opposite of the downward cardinal or inter-cardinal direction until the vehicle parks.

14. The method according to claim 13, further comprising utilizing output obtained from a pitch sensor that indicates when the vehicle is operating at an incline or a decline.

15. A vehicle, comprising:
- a controller having a processor and memory for storing instructions, the processor executing the instructions to:
- determine that the vehicle has entered a multilevel parking structure, the multilevel parking structure having ramps, turns, and level portions;
- obtain a layout of the multilevel parking structure, the layout comprising locations, lengths and cardinal or inter-cardinal directions of the ramps, the turns, and the level portions;
- gather vehicle data as the vehicle operates within the multilevel parking structure, the vehicle data comprising steering input, compass headings, and distance traveled; and
- determine a current level of the vehicle within the multilevel parking structure based on the layout and the vehicle data.

16. The vehicle according to claim 15, wherein the vehicle data are obtained by a vehicle sensor platform that includes a compass, an altimeter, an inclinometer, and dead-reckoning module.

17. The vehicle according to claim 15, further comprising a location module used to determine that the vehicle has entered the multilevel parking structure.

18. The vehicle according to claim 15, further comprising a communications interface, the communications interface being utilized to obtain the layout from a service provider or another connected vehicle.

19. The vehicle according to claim 15, wherein the processor is configured to determine a relative location of a parking spot occupied by the vehicle.

20. The vehicle according to claim 19, wherein the relative location is refined based on a direction of travel of the vehicle as identified in the compass headings.

* * * * *